June 4, 1940.  N. H. FREEMAN  2,203,137

APPARATUS FOR PRODUCING GAS FROM CARBON CONTAINING MATERIALS

Filed Nov. 23, 1938  2 Sheets-Sheet 1

Inventor:
Nat H. Freeman
By his Atty.

June 4, 1940.   N. H. FREEMAN   2,203,137
APPARATUS FOR PRODUCING GAS FROM CARBON CONTAINING MATERIALS
Filed Nov. 23, 1938   2 Sheets-Sheet 2

Inventor:
Nat H. Freeman

Patented June 4, 1940

2,203,137

UNITED STATES PATENT OFFICE 2,203,137

APPARATUS FOR PRODUCING GAS FROM CARBON CONTAINING MATERIALS

Nat Harris Freeman, London, England

Application November 23, 1938, Serial No. 242,029

6 Claims. (Cl. 48—99)

The invention relates to an apparatus for producing water gas from finely divided solid carbon containing materials, such as, coal, coke, charcoal, and the like, it being an object of the invention to provide a new and improved process and apparatus for producing such gas.

Another object is to provide an improved apparatus for producing water gas continuously and without interruption.

Another object is to provide an aparatus for producing water gas from finely divided solid carbonaceous materials, the apparatus using water (or preferably steam) heated to a temperature which will force the reaction of carbon and the oxygen of the water to combine in the form of carbon monoxide, freeing the hydrogen and producing the two gases, hydrogen and carbon monoxide which are mechanically mixed to form so-called water gas.

It is general practice today to produce water gas by first heating carbon or carbon containing materials by burning them in a furnace under a forced draft or air blast, and, when the carbon in the form of coke has reached an incandescent state, the air blast is turned off and a steam blast is turned into the white-hot mass. The reaction between the steam and carbon rapidly reduces the temperature of the material, and air must again be supplied to bring the carbon back to the combining temperature. This intermittent operation tends to produce large quantities of $CO_2$ and also tends to dilute the water gas with the nitrogen content of the air.

The present invention has for an object the obviating of the intermittent operation of the gas producing process, and at the same time preventing dilution of the gas by nitrogen or carbon dioxide. A more particular object is to accomplish this by maintaining the temperature of a gasifying chamber at a constant point at which the combining of the oxygen and carbon will be assured, preferably by the application of external heat, and at the same time supplying water to the gasifying chamber in the form of superheated steam, the steam being superheated to a temperature substantially above the combining point prior to its introduction to the gasifying chamber. Generally, the combining temperature is approximately 1,200° F., and the steam is preferably supplied at temperatures ranging from 1,800° to 2,000° F.

Other objects will become readily apparent from the following detailed description taken in connection with the accompanying drawings, in which:

Fig. 1 is a fragmentary vertical section through a preferred form of apparatus.

Fig. 2 is a fragmentary plan view partly in section along the line 2—2 of Fig. 1.

Fig. 3 is a transverse section along the line 3—3 of Fig. 1.

Figure 4:
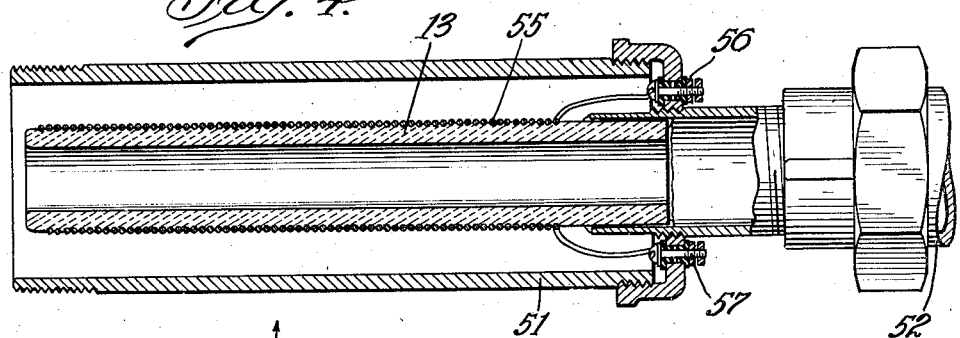
Fig. 4 is an enlarged fragmentary view partly in section along the line 4—4 of Fig. 3.

While I have illustrated in the drawings and described herein in detail a preferred form of apparatus and process for producing water gas, it is understood that the disclosure is to be considered as an exemplification of the principles of the invention and that it is not intended to limit the invention to the particular form of arrangement disclosed. The scope of the invention will be pointed out in the appended claims.

In its preferred form, the process for producing water gas consists generally of heating a continuously moving stream of pulverized coal or other carbon containing material to a temperature of approximately 1,200° F. and subjecting the material to the action of superheated steam which is introduced at approximately 2,000° F. and at the same time excluding air from contact with the heated material so as to prevent the formation of carbon dioxide and dilution by nitrogen. For purposes of disclosure, applicant has illustrated in the drawings a preferred form of apparatus for utilizing the process. This apparatus will now be described.

The apparatus comprises generally a gasifying chamber 10, a heating chamber 11, within which the gasifying chamber is located, a pulverized material supply chute 12 feeding into one end of the gasifying chamber, and a plurality of steam supply nozzles 13 for introducing steam into the gasifying chamber. The gasifying chamber 10 has a flat bottom wall or floor 14, end walls 15 and 16, and a semi-cylindrical top wall 17. These walls defining the chamber are preferably formed of non-porous fire clay or a suitable metal, such as, "Neehan" alloy steel, in order to withstand temperatures to which it is subjected. The gasifying chamber structure is mounted within the heating chamber 11 and is supported on the flat bottom wall 18 by means of a plurality of supporting blocks 19. As illustrated herein, the heating chamber 11 has end walls 20 and 21 and a semi-cylindrical top wall 22. A plurality of gas burners 23 extend through the bottom wall 18 of the heating chamber and are arranged to maintain a temperature of approximately 1,200° F. in the gasifying chamber by gas supplied through a common supply pipe 24. Suitable air inlets for the burners are provided at 25.

Figure 5:
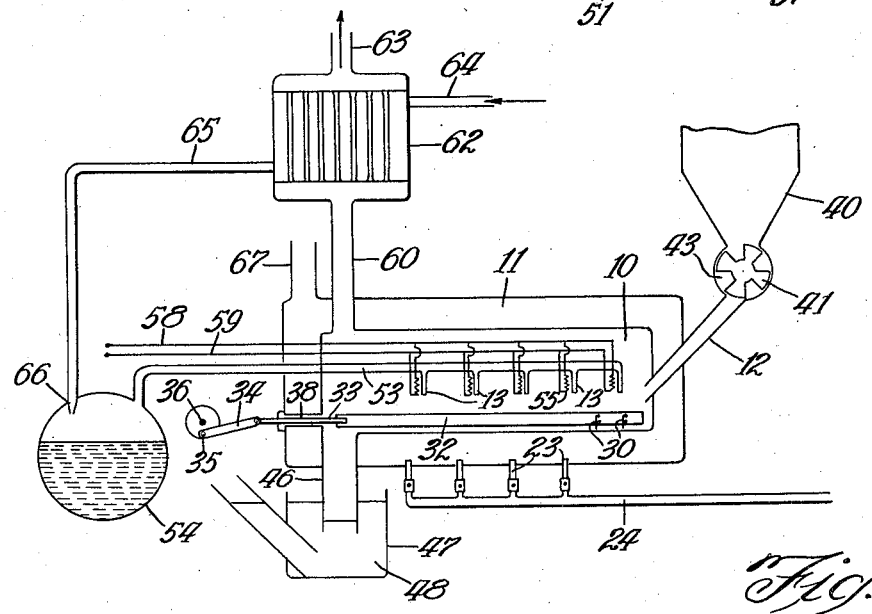
Fig. 5 is a diagrammatic representation of the apparatus.
Figure 6:
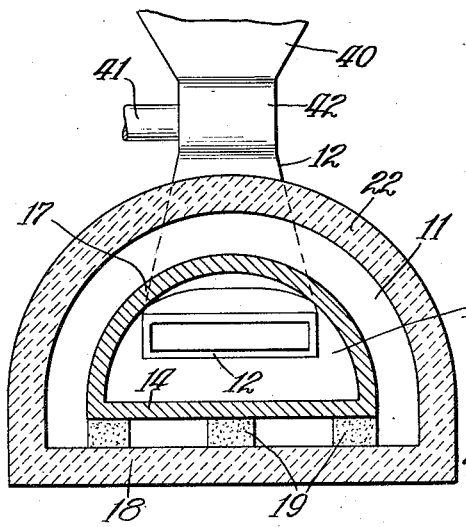
Fig. 6 is a transverse section along the line 6—6 of Fig. 1.

At the right hand end of the apparatus, as illustrated in Figs. 1 and 2, the end wall 16 of the gasifying chamber is provided with an opening 26 and the end wall 21 of the heating chamber is provided with an opening 27, through which openings the supply chute 12 extends. The chute is preferably provided with a wide opening 12' as illustrated in Fig. 6 so as to spread the pulverized material somewhat uniformly across the right hand end of the floor of the gasifying chamber. The fuel is moved toward the left across the floor of the chamber in a relatively thin layer by means of a conveyor mechanism herein shown in the form of reciprocating scrapers 30 which are pivotally mounted on a plurality of cross shafts 31 secured at their opposite ends to a pair of reciprocating bars 32. At their left hand ends (Fig. 1), the bars 32 are secured to rods 33 which extend through the end walls 15 and 20 of the gasifying and heating chambers and in turn are attached to links 34 (Fig. 5). The links are operated by means of eccentric pins 35 carried on a power driven shaft 36, the shaft being driven by suitable means during the operation of the apparatus so as to reciprocate the bars 32 and advance the fuel. The scrapers 30 are backed up by stop pins 37, as shown in Figs. 1 and 3, so that the scrapers are effective to move the fuel toward the left in Fig. 1 and are permitted to pivot in a clockwise direction when the bars 32 are moved toward the right so as to drag freely over the top of the fuel. Preferably, the rods 32 pass through suitable heat insulating bushings 38 which are arranged to prevent the entrance of air into the gasifying chamber.

In order to feed the pulverized fuel into the gasifying chamber without admitting air, the fuel is fed from a hopper 40 and into the chute 12 by means of a rotating cylinder 41 which is mounted within a casing 42 intermediate the hopper and chute. The cylinder 41 has a plurality of longitudinally extending peripheral pockets 43 which receive fuel from the hopper as they pass thereunder and discharge the fuel into the chute 12 as the pockets pass over the upper end of the chute. By regulating the speed of the feed cylinder 41, the quantity of fuel supplied to the gasifying chamber may be determined or regulated. The cylinder has a shaft 41' formed at one end which may be driven by a power source (not shown).

At its left hand end, the bottom wall 14 of the gasifying chamber has an ash discharge opening 45 which connects with a discharge duct 46 which in turn extends downwardly into a container 47 which is filled with water 48 to a level above the lower end of the duct 46 so as to provide a water seal. The ashes 49 discharged into the container 47 may be removed therefrom by means of a screw conveyor 50.

In order to produce water gas continuously, the invention not only provides the means hereinbefore described for heating the fuel in the gasifying chamber, but also provides means for continuously passing superheated steam into the gasifying chamber. This steam is introduced at a temperature well above the combining point of approximately 1,200° F. and preferably at a temperature of approximately 1,800° to 2,000° F.

The steam is introduced into the gasifying chamber by means of the nozzles or pipes 13 which are positioned in tubular bushings 51 extending through suitable openings in the walls 17 and 22 of the gasifying and heating chambers. The nozzles are connected by suitable pipes 52 to a steam supply pipe 53 (Fig. 5) which receives steam from a suitable boiler 54. The bushings 51 and the nozzles are preferably of a construction such as illustrated in detail in Fig. 4. As shown in Fig. 4, the nozzles 13 are wound with a suitable high resistance heating element wire 55 which is connected at its opposite ends to terminals 56 and 57 located externally of the heating chamber. Wires 58 and 59 connect to the terminals 56 and 57 of the heating elements and are arranged to be connected to a suitable source of electric current supply. In this manner, the nozzles 13 may be maintained at a predetermined high temperature so as to superheat the steam and to make certain that the steam entering the gasifying chamber is at the desired temperature.

Due to the fact that air is practically excluded from the gasifying chamber, the water gas formed in the operation of the apparatus is substantially free from carbon dioxide and nitrogen. This gas passes out through a discharge duct 60 which extends upwardly from the left hand end of the gasifying chamber (Fig. 1) and through an opening 61 in the top wall 22 of the heating chamber. As illustrated diagrammatically in Fig. 5, the duct 60 communicates at its upper end with a condenser 62 and passes from the condenser through a duct 63. The condenser may be supplied with water by means of a pipe 64, the water discharged from the condenser passing through a pipe 65 which connects to a suitable injector device 66 for feeding the water into the boiler 54. The heating chamber 11 is provided with a suitable stack 67 (Figs. 1 and 2) and preferably has a pair of doors 68 for closing an opening 69 in the end wall 21.

In operating the apparatus disclosed herein for the purpose of utilizing the process, it is contemplated that the burners 23 in the heating chamber will be lighted, that the feed cylinder 41 and shaft 36 will be driven continuously at the proper speeds, that the conductors 58 and 59 will be connected to a suitable source of electric current, that the boiler 54 will be in operation to produce steam in the proper quantities, that water will be supplied to the pipe 64 leading to the condenser 62, and that the ash removing feed screw 50 will be driven at a proper speed. Under these conditions, pulverized or powdered fuel will be supplied substantially continuously to the right hand end of the gasifying chamber 10, as shown in Fig. 1, and this fuel will be moved in a substantially continuous stream toward the left across the floor of the gasifying chamber. The operation of this apparatus is preferably such that the fuel reaches the "ash" state before it arrives at the discharge opening 45. During its movement through the gasifying chamber, the fuel is heated to a temperature at which the carbon therein will combine with the oxygen of the superheated steam, this temperature being approximately 1,200° F. As will be apparent, this heat is applied from an external source by the burners 23 and not by the combustion of the fuel in the gasifying chamber. During the operation of the apparatus, steam, superheated to a temperature substantially above the combining temperature, is introduced through the pipes 13. As illustrated in the preferred embodiment of the invention, the steam is superheated electrically by means of the heating coils 55. By controlling the current supplied to the coils, the degree of superheat may be readily adjusted and maintained.

It will be readily apparent that the apparatus excludes air from the gasifying chamber, the fuel feeding cylinder 41 operating to exclude air at the fuel inlet and the water seal 48 operating to exclude air at the ash discharge opening. During the operation of the apparatus, the process of producing water gas is continuous, as distinguished from the intermittent process used heretofore. The fuel supply is continuous, the movement of the stream of fuel through the gasifying chamber is continuous, the application of external heat is continuous, and the supply of superheated steam is continuous. The result is a water gas of high calorific value substantially free from carbon dioxide and nitrogen dilution.

In the production of water gas, the heat for the dissociation of the water into hydrogen and oxygen must be supplied from a source other than that evolved by the combining of carbon with oxygen to form CO since the heat so produced by this combination is inadequate for the dissociation, hence, the necessity for the alternating of the gas production and heating periods by the methods heretofore used. By supplying the necessary heat from an external source and preheating the steam, economy of operation is attained and a higher calorific gas produced.

I claim as my invention:

1. An apparatus for producing water gas from finely divided solid carbon containing materials comprising a horizontally extending gasifying chamber having a flat bottom wall and a semi-cylindrical upper wall, means forming a heating chamber surrounding said gasifying chamber with the heating chamber walls spaced from the gasifying chamber walls, means for producing heat in said heating chamber to maintain the gasifying chamber at a high temperature, means for supplying carbon containing material to one end of said gasifying chamber comprising a chute extending thereinto, a hopper and means for discharging measured quantities of material from said hopper into the chute and excluding air, means for moving said material along the bottom wall of said gasifying chamber, and means for introducing superheated steam into said gasifying chamber including a plurality of steam pipes positioned with their discharge ends communicating with said gasifying chamber, and electrically operated heating elements surrounding said pipes adjacent their discharge ends.

2. An apparatus for producing water gas from finely divided solid carbon containing materials comprising a horizontally extending gasifying chamber having a flat bottom wall, means forming a heating chamber surrounding said gasifying chamber, means for producing heat in said heating chamber to maintain the gasifying chamber at a combining temperature, means for supplying carbon containing material to one end of said gasifying chamber comprising a chute extending thereinto, a hopper, means for discharging material from said hopper into the chute and excluding air, means for moving said material along the bottom wall of said gasifying chamber, and means for introducing superheated steam at approximately 1,800° F. into said gasifying chamber including a plurality of steam pipes positioned with their discharge ends communicating with said gasifying chamber, and superheating means surrounding said pipes adjacent their discharge ends.

3. An apparatus for producing water gas from pulverized solid carbon containing materials comprising, in combination, means forming an elongated gasifying chamber having an opening at one end for the entrance of such materials and ash and gas discharge openings at its other end, means for feeding measured quantities of pulverized materials through said opening and for excluding air therefrom, means for moving such materials through said chamber toward the ash discharge opening, means for heating said chamber to approximately 1,200° F., and means for supplying superheated steam into said chamber at points spaced apart along the path of travel of said materials including steam discharge means projecting into the chamber.

4. An apparatus for producing water gas from finely divided solid carbonaceous fuels comprising a horizontally extending elongated gasifying chamber having a flat bottom wall, a heating chamber surrounding said gasifying chamber, a plurality of burners in said heating chamber below said gasifying chamber bottom wall for maintaining the gasifying chamber at a high temperature, means for supplying said fuel to one end of the gasifying chamber comprising a chute extending through an end wall of said heating chamber and gasifying chamber and having a discharge opening of a width adapted to discharge said fuel substantially across the bottom of said gasifying chamber, a feeding mechanism for moving said fuel longitudinally along the bottom of said gasifying chamber, means for introducing heated steam into said gasifying chamber including a plurality of steam pipes arranged in opposing rows and extending through the heating chamber and gasifying chamber walls, electrical heating elements surrounding said steam pipes intermediate said walls to control the steam temperature at the discharge ends of said pipes, and ash and gas discharge ducts leading from the discharge end of said gasifying chamber and through openings in the adjacent walls of the heating chamber.

5. An apparatus for producing water gas from finely divided solid carbonaceous fuels comprising a horizontally extending gasifying chamber having a flat bottom wall, a heating chamber surrounding all sides of said gasifying chamber, a plurality of burners in said heating chamber below said gasifying chamber bottom wall for maintaining the gasifying chamber at a high temperature, means for supplying said fuel to one end of the gasifying chamber comprising a chute extending through an end wall of said heating chamber and gasifying chamber and having a discharge opening positioned to discharge said fuel substantially across the bottom of said gasifying chamber, means including a hopper for supplying said fuel to said chute, a feeding mechanism for moving said fuel longitudinally along the bottom of said gasifying chamber, means for introducing heated steam into said gasifying chamber including a plurality of steam pipes extending through the heating chamber and gasifying chamber walls and electrical heating elements associated with said steam pipes intermediate said walls to control the steam temperature at the discharge ends of said pipes.

6. An apparatus for producing water gas from finely divided solid carbonaceous fuels comprising a horizontally extending gasifying chamber, a heating chamber surrounding said gasifying chamber, a plurality of burners in said heating chamber below said gasifying chamber for maintaining the gasifying chamber at a high temperature, means for supplying said materials to one end of the gasifying chamber comprising a chute extending through an end wall of said heating chamber and gasifying chamber, means for introducing heated steam into said gasifying chamber including a plurality of steam pipes arranged in opposing rows and extending through the heating chamber and gasifying chamber walls and electrical heating elements surrounding said steam pipes intermediate said walls to control the steam temperature at the discharge ends of said pipes.

NAT HARRIS FREEMAN.